(12) United States Patent
Thies

(10) Patent No.: US 8,845,220 B2
(45) Date of Patent: Sep. 30, 2014

(54) WRITING, DRAWING, PAINTING AND /OR COSMETICS PENCIL AND METHOD OF PRODUCING THE SAME

(75) Inventor: Andreas Thies, Effeltrich (DE)

(73) Assignee: J.S. Staedtler GmbH & Co. KG, Nürnberg (DE)

( * ) Notice: Subject to any disclaimer, the term of this patent is extended or adjusted under 35 U.S.C. 154(b) by 545 days.

(21) Appl. No.: 12/311,411

(22) PCT Filed: Sep. 20, 2007

(86) PCT No.: PCT/EP2007/008177
§ 371 (c)(1),
(2), (4) Date: Mar. 27, 2009

(87) PCT Pub. No.: WO2008/040449
PCT Pub. Date: Apr. 10, 2008

(65) Prior Publication Data
US 2010/0003061 A1    Jan. 7, 2010

(30) Foreign Application Priority Data

Sep. 29, 2006   (DE) .................. 10 2006 046 491

(51) Int. Cl.
| | |
|---|---|
| B43K 19/00 | (2006.01) |
| B29C 47/00 | (2006.01) |
| B43K 19/16 | (2006.01) |
| B43K 19/02 | (2006.01) |
| B43K 19/14 | (2006.01) |
| A45D 40/20 | (2006.01) |
| B29C 47/12 | (2006.01) |

(52) U.S. Cl.
CPC ............. *B43K 19/02* (2013.01); *B29C 47/0016* (2013.01); *B43K 19/16* (2013.01); *A45D 40/20* (2013.01); *B29C 47/128* (2013.01); *B43K 19/14* (2013.01)
USPC .................................. 401/96; 401/88; 401/49

(58) Field of Classification Search
USPC .................................................. 401/49, 96, 88
See application file for complete search history.

(56) References Cited

U.S. PATENT DOCUMENTS

| | | | | |
|---|---|---|---|---|
| 1,937,104 | A | * | 11/1933 | Thomsen ........................ 401/96 |
| 2,790,202 | A | * | 4/1957 | Lorenian ........................ 401/96 |
| 3,551,064 | A | | 12/1970 | Bartner |
| 3,875,088 | A | * | 4/1975 | Arons et al. .................... 401/96 |

(Continued)

FOREIGN PATENT DOCUMENTS

| | | |
|---|---|---|
| DE | 102004021048 | 11/2005 |
| DE | 102005004175 | 7/2006 |
| EP | 0 505 262 | 9/1992 |

*Primary Examiner* — David Walczak
*Assistant Examiner* — Bradley Oliver
(74) *Attorney, Agent, or Firm* — Lucas & Mercanti, LLP; Klaus P. Stoffel

(57) ABSTRACT

The invention relates to a pencil 1 for writing, drawing, painting and/or cosmetics purposes, comprising a colored core 11 and a core holder enclosing the core 1, wherein the core holder comprises a wood-replacement material 12 which encloses the core 1, wherein the core 1 and core holder are retained such that they cannot be displaced in relation to one another, wherein the core holder has a carrying sleeve 13 which encloses the wood-replacement material 12, and wherein the modulus of elasticity of the carrying sleeve 13 is equal to, or higher than, that of the wood-replacement material and the bending strength of the carrying sleeve is higher than that of the wood-replacement material.

19 Claims, 2 Drawing Sheets

(56) References Cited

U.S. PATENT DOCUMENTS

Figure 1:
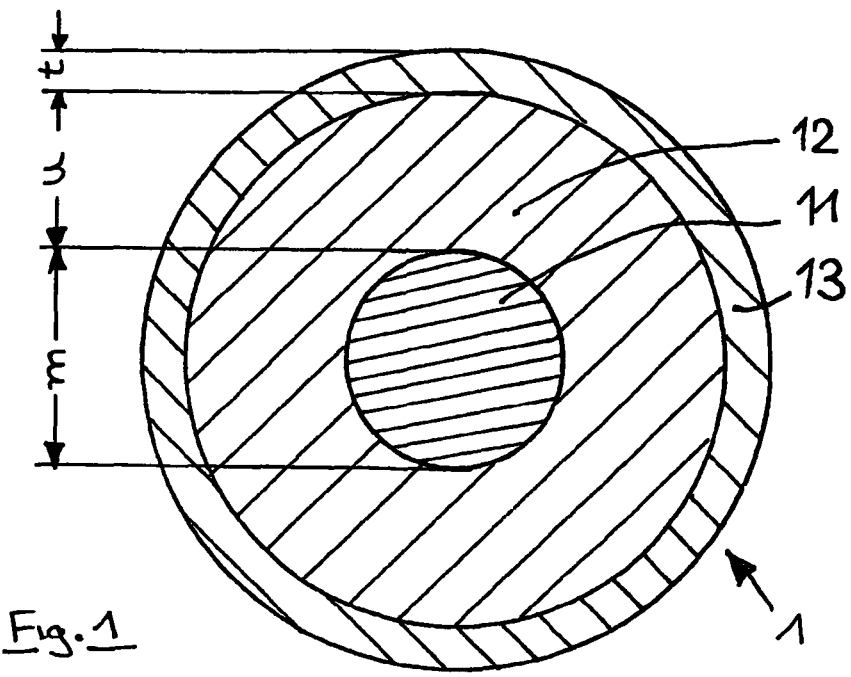

| | | | |
|---|---|---|---|
| 3,983,195 A * | 9/1976 | Arons et al. | 264/45.3 |
| 3,993,408 A * | 11/1976 | Arons et al. | 401/96 |
| 4,176,978 A * | 12/1979 | Ruzicka et al. | 401/96 |
| 4,334,546 A * | 6/1982 | Floyd et al. | 401/96 |
| 4,490,415 A * | 12/1984 | Imamura et al. | 401/88 |
| 4,522,522 A * | 6/1985 | Zeitelhack | 401/88 |
| 5,244,297 A * | 9/1993 | Bachelet et al. | 401/96 |
| 5,340,226 A * | 8/1994 | Griebel et al. | 401/96 |
| 5,735,622 A * | 4/1998 | Melnick et al. | 401/96 |
| 6,241,409 B1 * | 6/2001 | Holloway et al. | 401/49 |
| 6,478,494 B1 * | 11/2002 | Eckl et al. | 401/96 |
| 6,572,295 B1 * | 6/2003 | Chochoy et al. | 401/96 |
| 8,188,175 B2 * | 5/2012 | Lins et al. | 524/275 |
| 2003/0022962 A1 * | 1/2003 | Cook et al. | 523/164 |
| 2007/0027234 A1 * | 2/2007 | Sigworth et al. | 524/13 |
| 2009/0087775 A1 * | 4/2009 | Kunou et al. | 430/270.1 |
| 2010/0152386 A1 * | 6/2010 | Miwa et al. | 525/98 |
| 2011/0129284 A1 * | 6/2011 | Thies et al. | 401/49 |
| 2011/0172332 A1 * | 7/2011 | Lins et al. | 524/13 |
| 2013/0121747 A1 * | 5/2013 | Biebuyck et al. | 401/88 |

* cited by examiner

WRITING, DRAWING, PAINTING AND /OR COSMETICS PENCIL AND METHOD OF PRODUCING THE SAME

The invention relates to a writing, drawing, painting and/or cosmetics pencil and a method of producing the same, according to the preamble of the main claim.

Writing, drawing, painting and/or cosmetics pencils, in which a core suitable for writing is enclosed by a strength-giving material are known in principle. The core, in this case, is non-displaceably retained in the casing.

Cores are known which are glued into small grooved wooden boards, where the wooden surface, if desired, is covered by a decorative finish. With pencils of this kind it is considered disadvantageous that the cores are enclosed in precious woods which results in consuming natural wood resources. In addition it is considered disadvantageous that an elaborate and expensive manufacturing process is needed in order to produce good-quality pencils of this kind.

Further, co-extruded and tri-extruded pencils are known, in which a core material is enclosed in a casing, whereby usually both the core and the casing are polymer-bound materials. When designing the sharpenable casing, there is a conflict of interests between good sharpenability on the one hand and high bending strength and stiffness on the other, which are both needed in order to effectively protect the brittle core against breaking.

An extruded pencil of this kind is known, for instance, from the EP 0 505 262 B1. The pencil described here consists of a casing of foamed polystyrenes and a flexible polystyrene-bound core.

With pencils of this kind it is considered disadvantageous that the mantle or casing surrounding the core is not typically wooden in character when being sharpened and in that the core, as regards flexibility, is distinctly less flexible than the mantle which leads to the core breaking easily and quickly when the pencil is bent, which for the user reduces the usefulness of the pencil or even questions its usability.

It is therefore the requirement of the invention to provide a writing, drawing, painting and/or cosmetics pencil which does not have the disadvantages mentioned in the beginning, and which, in particular, reliably solves the conflict of interests between good sharpenability and high bending strength and stiffness of the casing.

This requirement is met by the characterizing features of claims 1 and 17. Advantageous further developments are given in the sub-claims.

Pencils for writing, drawing, painting and/or cosmetics purposes are understood to be cores encased in sharpenable materials. Examples for this type of pencil are lead, colour and cosmetics pencils.

The requirement is met in that the pencil according to the invention has a colour-dispensing core and a core holder enclosing the core, wherein the core holder comprises a casing consisting of a wood-replacement material which encloses the core, wherein the core and core holder are retained such that they cannot be displaced in relation to one another. The core holder also comprises a carrying sleeve whereby the carrying sleeve encloses the wood-replacement material. The modulus of elasticity of the carrying sleeve is equal to or higher than, and the bending strength of the carrying sleeve is higher than, that of the wood-replacement material. The modulus of elasticity of the carrying sleeve is at least 4000 MPa, in particular 5000 MPa.

The bending strength of the carrying sleeve is greater than or equal to 40 MPa, in particular 50 to 80 MPa.

The carrying sleeve consists of a polymer, a mixture of various polymers, or a polymer or polymeric mix filled with at least one organic and/or anorganic filler.

The wood-replacement material as well as the carrying sleeve are arranged concentrically to the core. A concentric arrangement ensures that the strength and writing characteristics of the pencil remain the same in all orientations, independently of the writing position.

Since thanks to the carrying sleeve the contribution required by the wood-replacement material to the overall bending strength may be less, greater emphasis may be placed on the sharpenability and wood-like appearance of the wood-replacement material when designing the same.

The core may, for example, be designed as a core which is mantled. In this case it is constructed as known from the DE 10 2005 004 175.

On its surface the carrying sleeve may have coatings designed as a separate decorative finish, for example, as a striped design or in the form of haptic layers.

If suitably coloured the carrying sleeve may simultaneously act as carrier for the decoration of the pencil.

At this point it should be noted that the overall pencil system with carrying sleeve corresponds, in its widest sense, to the functional construction of a technical writing utensil such as, for example, a fibre pen or ball-point pen.

The pencil according to the invention will now be described in detail with reference to the following figures.

Figure 2:
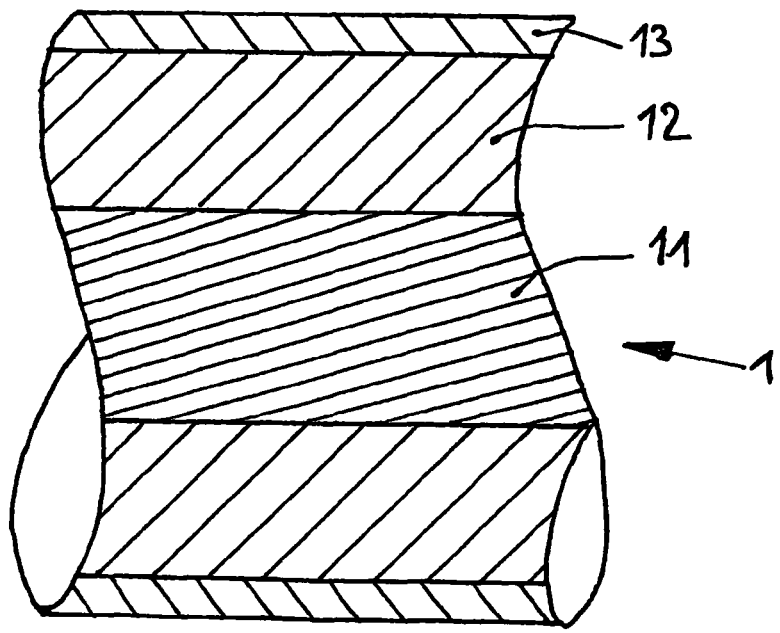
Figure 3:
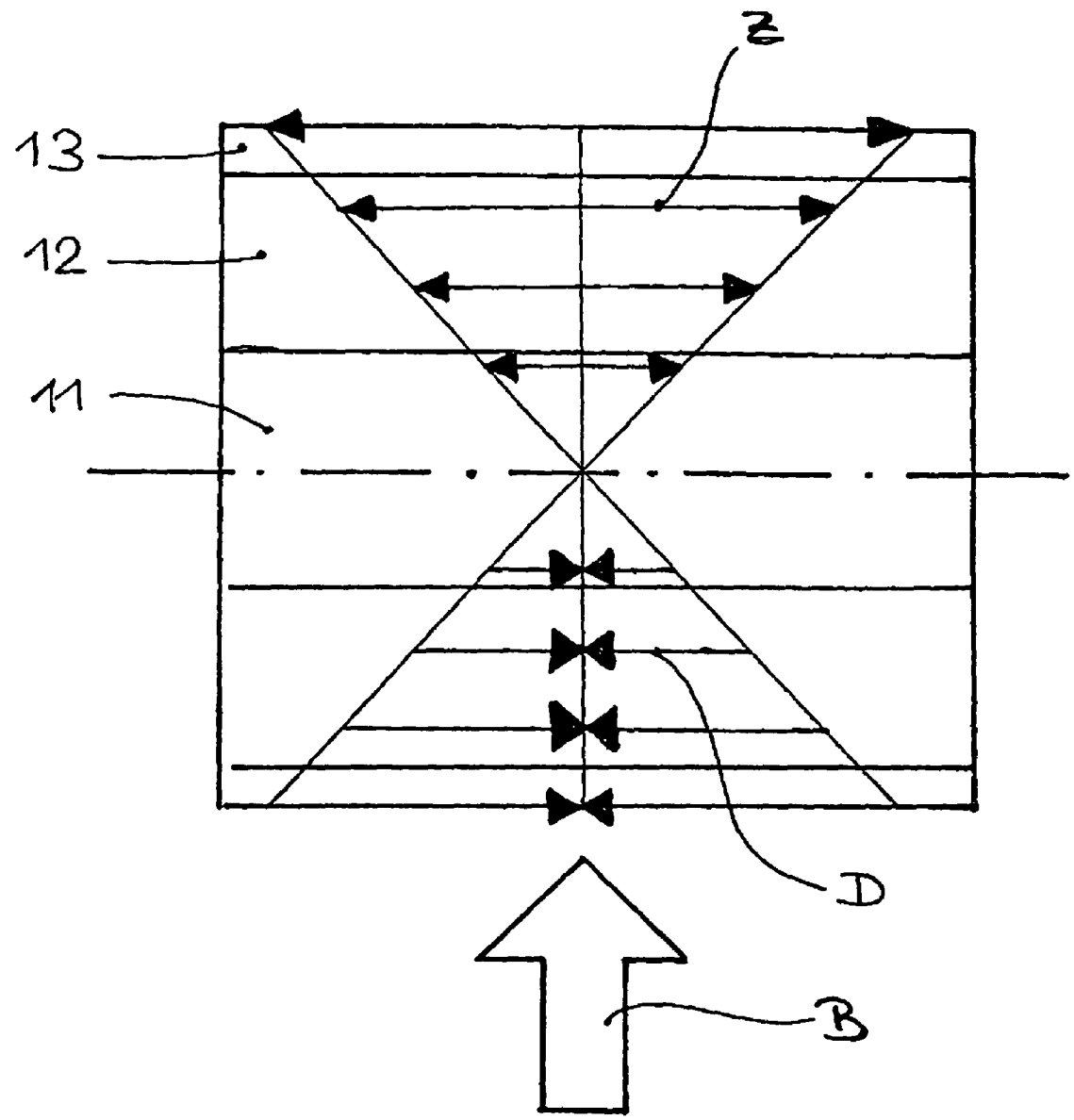

FIG. 1: shows a cross-section vertical to the longitudinal axis through a pencil according to the invention;

FIG. 2: shows a longitudinal section through a pencil according to the invention, as depicted in FIG. 1;

FIG. 3: shows a stress diagram resulting from a bending load applied, on the pencil of FIG. 2.

FIG. 1 shows a cross-section through a pencil 1 constructed according to the invention, which pencil is composed of at least three elements. This is a concentrically designed system with a centrally arranged core 11 with a diameter m, the core being enclosed in a casing 12 with a wall thickness u, which, for example, may be a layer made of a wood-replacement material 12. A carrying sleeve 13 with a wall thickness t is formed or arranged around the system consisting of core 11 and casing 12.

FIG. 2 shows a longitudinal section through a pencil 1 according to the invention, as shown in FIG. 1. This view clearly shows the core holder consisting of casing 12 and carrying sleeve 13, which surround core 11.

Stresses resulting from a bending load or an applied bending force B are illustrated in FIG. 3. Bending force B produces compressive stresses D in one half and tensile stresses Z in the other. Compressive stresses D in the compressed zone are comparatively non-dangerous, whilst in the other half, i.e. in the tensioned zone, there exist or occur dangerous tensile stresses Z. In the pencil construction shown the greatest tensions occur in the edge zone, but these are absorbed without problems by the strength-giving carrying sleeve 13.

Compressive and tensile stresses acting on the pencil as a result of bending loads are at their maximum on the periphery of the pencil and decrease towards 0 in direction of the symmetrical axis of the pencil. The carrying sleeve 13 is thus in the ideal position, i.e. in the place where maximum tensile and compressive stresses occur, and can therefore absorb a large portion of the stresses, thus noticeably relieving the load on the overall pencil system 1 consisting of carrying sleeve 13, casing 12 and core 11, in particular the load on core 11.

It has become evident that fluctuations in quality and manufacturing tolerance of the wood-replacement material can be evened out or balanced out through use of the carrying sleeve.

As a rule the carrying sleeve may be constructed of cheaper raw materials than the casing of the core, which is accurately adjusted to match the required sharpenability and optical appearance.

With this type of pencil design it is advantageous that, despite the increase in strength through use of the carrying sleeve, there is no deterioration in writing quality, since the core can continue to be composed in the same way as known from the prior art. On the contrary, the core may be noticeably further optimised, in particular as regards its writing characteristics, since the carrying sleeve contributes substantially to the strength of the overall system and as a result of the high modulus of elasticity also allows the use of more brittle cores.

The cross-section of the pencil may be circular, oval, triangular, hexagonal, rectangular or practically any desired shape.

If several carrying sleeves are present, individual sleeves may have different colours and/or compositions.

In order to manufacture high-quality pencils the following initial conditions should be met. The carrying sleeve of a pencil according to the invention should be designed such that the shrinkage behaviour of the carrying sleeve matches the shrinkage behaviour of the casing, and such that the volume of the carrying sleeve is smaller than or equal to the volume of the core casing.

It can be placed on record that due to the inventive design of the pencil both bending strength and stiffness (modulus of elasticity) are increased thereby preventing the brittle core from breaking when the pencil is excessively bent.

In order to further illustrate the invention reference may be made to the following examples of recipe compositions for core, casing and carrying sleeve.

Example Recipe for a Coloured Core:

| Polystyrene | 15% by weight |
|---|---|
| waxes | 5% by weight |
| fillers and pigments | 80% by weight |

Example Recipe for a Casing Made from Wood-Replacement Material:

| wood fibres | 70% by weight |
|---|---|
| Polyolefine | 20% by weight |
| bonding agent | 5% by weight |
| waxes | 5% by weight |

Example Recipe for a Carrying Sleeve:

| wood fibres | 70% by weight |
|---|---|
| Polyolefine | 20% by weight |
| bonding agent | 10% by weight |

The core in the example is a polymer-bound core. The wood-replacement material is formed of a polymer, a mixture of polymers, bonding agent, or a polymeric mix filled with at least one organic and/or anorganic filler, wherein the polymer or the polymeric mix may be foamed. to 80% by weight of the at least one filler are contained in the filled polymer.

The bonding agent used may, for example, be a maleic anhydride—a grafted polymer.

For better understanding the following table gives a comparison between materials used in the invention and a material used in the prior art.

|  | Cedar wood (prior art) | Wood-replacement material (casing) | Carrying sleeve |
|---|---|---|---|
| Bending strength MPa | 90 | 60 | 100 |
| Modulus of elasticity Mpas | 5700 | 5900 | 6700 |
| Sharpening moment in Ncm | 7 to 12 | 10 | 18 |

The sharpening moment is the moment or turning moment which must be applied when sharpening a rod-shaped and/or sleeve-shaped body by means of a commercially available sharpener.

The wood-replacement material, when viewed in cross-section vertically to the longitudinal axis of the pencil, has a wall thickness in the range between 0.5 and 2 mm, in particular in the range between 1 and 3 mm.

The diameter of the core lies in the range between 1.5 and 7 mm, in particular between 2 and 6 mm.

The wall thickness of the carrying sleeve, when viewed in cross-section vertically to the longitudinal axis of the pencil, has a thickness t in the range between 0.5 and 2 mm, in particular between 0.5 and 1 mm.

A bonding agent layer may be provided between the core and the wood-replacement material and/or between the wood-replacement material and the carrying sleeve.

The carrying sleeve may contribute to the optical appearance by colouring the sleeve, in particular by colouring it in the colour of the core or in the colour of the wood-replacement material.

Alternatively the carrying sleeve may be provided with a decorative layer on the side facing away from the wood-replacement material.

A pencil according to the invention may, for example, be manufactured by multiple extrusion or alternatively by co-extrusion around an already manufactured core or core string. For example, the core, the wood-replacement material and the carrying sleeve may be co-extruded.

The writing, drawing, painting or cosmetics pencil comprising a colour-dispensing core and a core holder enclosing the core, wherein the core holder comprises a casing made of a wood-replacement material which encloses the core, wherein the core and the core holder are retained such that they cannot be displaced in relation to one another, wherein the core holder has a carrying sleeve, wherein the carrying sleeve encloses the wood-replacement material and wherein its modulus of elasticity is equal to or higher than, and its bending strength is higher than, that of the wood-replacement material.

The carrying sleeve is formed of a polymer, a mixture of polymers, or a polymer or polymeric mix filled with at least one organic and/or anorganic filler, whereby the modulus of elasticity of the carrying sleeve is at least 4000 MPa, in particular 5000 MPa. The bending strength of the carrying sleeve is greater than or equal to 40 MPa, in particular 50 to 80 MPa. The core is a polymer-bound core.

The wood-replacement material is formed of a polymer, a mixture of polymers, bonding agent, or a polymeric mix filled with at least one organic and/or anorganic filler, whereby the polymer or polymeric mix is foamed.

50 to 80% by weight of the at least one filler are contained in the polymer. The wood-replacement material, when viewed in cross-section vertically to the longitudinal axis of the pencil, has a wall thickness in the range between 0.5 and 2 mm, in particular between 1 and 3 mm. The core has a diameter m in the range between 1.5 and 7 mm, in particular in the range between 2 and 6 mm, and the carrying sleeve, when viewed in cross-section vertically to the longitudinal axis of the pencil, has a thickness t in the range between 0.5 and 2 mm, in particular in the range between 0.5 and 1 mm.

The carrying sleeve is coloured, in particular in a colour of the core or in the colour of the wood-replacement material.

A bonding agent layer is provided between the core and the wood-replacement material and/or between the wood-replacement material and the carrying sleeve. In addition the carrying sleeve may be provided with a decorative layer on its side facing away from the wood-replacement material.

The sharpening moment of the pencil is the same as that of a pencil with a core holder made of wood.

A method for manufacturing a pencil according to the invention consists in co-extruding the core, the wood-replacement material and the carrying sleeve.

LIST OF REFERENCE SYMBOLS

1 Pencil
11 core
12 casing/core mantle
13 carrying sleeve
(14) decorative layer
m=core diameter
u=wall thickness of casing
t=wall thickness of carrying sleeve
B=bending force
D=compressive stress
Z=tensile stress

The invention claimed is:

1. Lead, color and/or cosmetics pencil comprising a color-dispensing core and a core holder enclosing the core, wherein the core holder comprises a casing consisting of a wood-replacement material which encloses the core, wherein the core and the core holder are retained in such a way that they cannot be displaced in relation to one another, wherein the core holder has a carrying sleeve (13), the carrying sleeve (13) encloses the wood-replacement material (12), and the modulus of elasticity of the carrying sleeve (13) is equal to or higher than, and the bending strength of the carrying sleeve is higher than that of the wood-replacement material (12), wherein the carrying sleeve (13) is formed of a polymer filled with at least one organic filer or a polymeric mix filled with at least one organic filler, wherein the wood-replacement material (12) is formed of a polymeric mix filled with at least one organic filler, wherein 50 to 80% by weight of the at least one filler is contained in the filled polymer of the carrying sleeve and the wood replacement material.

2. Pencil according to claim 1, wherein the modulus of elasticity of the carrying sleeve (13) is at least 4000 MPa.

3. Pencil according to claim 1, wherein the bending strength of the carrying sleeve (13) is greater than or equal to 40 MPa.

4. Pencil according to claim 1, wherein the wood-replacement material (12) as well as the carrying sleeve (13) are arranged concentrically to the core (11).

5. Pencil according to claim 1, wherein the core (11) is a polymer-bound core.

6. Pencil according to claim 1, wherein the polymer or the polymeric mix is foamed.

7. Pencil according to claim 1, wherein the wood-replacement material (12), when viewed in cross-section vertically to the longitudinal axis of the pencil (1), has a wall thickness in the range between 0.5 and 3 mm.

8. Pencil according to claim 1, wherein the core (11) has a diameter m in the range between 1.5 and 7 mm.

9. Pencil according to claim 1, wherein the carrying sleeve (13), when viewed in cross-section vertically to the longitudinal axis of the pencil (1), has a wall thickness t in the range between 0.5 and 2 mm.

10. Pencil according to claim 1, wherein the carrying sleeve (13) is colored, in particular in a color of the core (11) or in the color of the wood-replacement material (12).

11. Pencil according to claim 1, wherein a bonding agent layer is formed between the core (11) and the wood-replacement material (12) and/or between the wood-replacement material (12) and the carrying sleeve (13).

12. Pencil according to claim 1, wherein the carrying sleeve (13) is provided with a decorative layer (14) on the side facing away from the wood-replacement material (12).

13. Pencil according to claim 1, wherein the sharpening moment of the pencil (1) is the same as that of a pencil (1) with a core holder made of wood.

14. Method for producing a pencil according to claim 1, wherein the core (11), the wood-replacement material (12) and the carrying sleeve (13) are co-extruded.

15. Pencil according to claim 2, wherein the modulus of elasticity of the carrying sleeve is 5000 MPa.

16. Pencil according to claim 3, wherein the bending strength of the carrying sleeve is 50 to 80 MPa.

17. Pencil according to claim 7, wherein the wall thickness of the wood-replacement material is in the range between 1 and 2 mm.

18. Pencil according to claim 8, wherein the diameter of the core is in the range between 2 and 6 mm.

19. Pencil according to claim 9, wherein the wall thickness of the carrying sleeve is in the range between 0.5 and 1 mm.

* * * * *